US008285236B2

(12) United States Patent
Hue et al.

(10) Patent No.: US 8,285,236 B2
(45) Date of Patent: Oct. 9, 2012

(54) METHOD AND DEVICE FOR PROCESSING THE DC OFFSET OF A RADIOFREQUENCY RECEPTION SUBSYSTEM

(75) Inventors: Antoine Hue, Saint Genis Pouilly (FR); Gabriel Della-Monica, Moirans (FR); Florent Sibille, Grenoble (FR)

(73) Assignees: STMicroelectronics SA, Montrouge (FR); STMicroelectronics N.V., Amsterdam (NL); STMicroelectronics (Grenoble) SAS, Grenoble (FR)

( * ) Notice: Subject to any disclaimer, the term of this patent is extended or adjusted under 35 U.S.C. 154(b) by 608 days.

(21) Appl. No.: 12/505,671

(22) Filed: Jul. 20, 2009

(65) Prior Publication Data

US 2010/0022214 A1 Jan. 28, 2010

(30) Foreign Application Priority Data

Jul. 25, 2008 (EP) .................................... 08305422

(51) Int. Cl.
*H04B 17/00* (2006.01)
*H04B 1/00* (2006.01)
*H04L 27/08* (2006.01)

(52) U.S. Cl. .................. 455/226.1; 455/234.1; 455/296; 455/311; 375/345; 375/346

(58) Field of Classification Search ............... 455/67.11, 455/67.13, 226.1, 234.1, 245.1, 296, 309, 455/311; 375/345, 346, 348, 319
See application file for complete search history.

(56) References Cited

U.S. PATENT DOCUMENTS

| | | | | |
|---|---|---|---|---|
| 5,715,281 | A | 2/1998 | Bly et al. | 375/344 |
| 6,128,353 | A | 10/2000 | Ho et al. | 375/345 |
| 6,225,848 | B1 | 5/2001 | Tilley et al. | 327/307 |
| 6,459,889 | B1 | 10/2002 | Ruelke | 455/296 |
| 6,498,929 | B1 * | 12/2002 | Tsurumi et al. | 455/296 |
| 6,625,424 | B1 | 9/2003 | Mohindra | 455/84 |
| 6,868,128 | B1 | 3/2005 | Lane | 375/319 |
| 7,171,185 | B2 * | 1/2007 | Matsumoto et al. | 455/324 |
| 7,653,369 | B2 * | 1/2010 | Simmons et al. | 455/234.1 |
| 7,978,788 | B2 * | 7/2011 | Hui et al. | 375/319 |
| 8,036,622 | B2 * | 10/2011 | Sun et al. | 455/296 |
| 2004/0264608 | A1 | 12/2004 | Habuka et al. | 375/345 |
| 2006/0120435 | A1 | 6/2006 | Punzenberger et al. | 275/132 |
| 2007/0063757 | A1 | 3/2007 | Bouras | 327/307 |
| 2010/0020903 | A1 * | 1/2010 | Hue et al. | 375/319 |

OTHER PUBLICATIONS

Pellat et al., "Fully-integrated WCDMA SiGeC BiCMOS transceiver", Porceedings of ESSCIRC, Grenoble, France, IEEE, 2005, pp. 519-522.

* cited by examiner

*Primary Examiner* — Nhan Le
(74) *Attorney, Agent, or Firm* — Allen, Dyer, Doppelt, Milbrath & Gilchrist, P.A.

(57) ABSTRACT

A method may compensate for direct current (DC) offset in a radio frequency reception device. The method may include partitioning an analog portion of the reception device into a plurality of zones, for each zone, calibrating initial DC offset compensation to be applied within an operating range of a respective zone, the operating range of the other zones being limited to a threshold operating range, and determining DC offset compensation to be applied to the reception device throughout the operating range based on the basic DC offset compensations.

23 Claims, 5 Drawing Sheets

| $G_{PMA}$ \ $G_{LNA}$ | $G_{LNA}(0)$ | | $G_{LNA}(p)$ | | $G_{LNA}(Mx)$ | $STOP_{LNA}$ |
|---|---|---|---|---|---|---|
| L1 → $G_{PMA}(0)$ | X | X | X | | X | X | X |
| | 0 | 0 | 0 | | 0 | 0 | X |
| | 0 | 0 | 0 | | 0 | 0 | X |
| | | | | | | | |
| $G_{PMA}(k)$ | 0 | 0 | 0 | | 0 | 0 | X |
| | | | | | | | |
| | 0 | 0 | 0 | | 0 | 0 | X |
| | 0 | 0 | 0 | | 0 | 0 | X |
| $G_{PMA}(Mx)$ | 0 | 0 | 0 | | 0 | 0 | X |

X = MEASURED VALUE
O = CALCULATED VALUE

CLD ↑ (last column)

METHOD AND DEVICE FOR PROCESSING THE DC OFFSET OF A RADIOFREQUENCY RECEPTION SUBSYSTEM

FIELD OF THE INVENTION

The invention relates to the processing of imperfections of a RF reception subsystem and, more particularly, the imperfection of the direct current offset.

BACKGROUND OF THE INVENTION

The direct current (DC) offset is a typical defect of radio frequency (RF) reception subsystems, more particularly, direct conversion reception sub systems, also called zero intermediate frequency (ZIF). It is in typical to compensate for DC offset before performing a demodulation operation in order to improve overall reception processing performance. An excessive DC offset that is not compensated for in the analog part of the reception subsystem may use a large analog-to-digital converter dynamic range, which may not be desirable.

One cause of this DC offset originates in leakage from the local oscillator signal (transposition signal), which is intended for the transposition stage of the subsystem (mixer) at the input of the low noise amplifier of this subsystem and at the input of the mixer itself. This leakage signal is consequently amplified and multiplied by itself in the mixer to create this DC offset. Moreover, all the elements of the subsystem that have a gain naturally amplify this DC offset.

Essentially, two types of approaches have been disclosed to address this DC offset. A first approach includes using a high-pass filter operation. However, such an approach uses precise control of the cut-off frequency and of the phase response of the filter, which can lead to relatively costly and bulky filter designs. Moreover, analog filters are used for the calibration of the cut-off frequencies. In order to avoid a factory calibration, which is costly, it is may be helpful to use an on-chip calibration. However, such tunable analog filters use a surface area that is far greater than that of the chip itself.

The second type of approach is aimed more at compensating for the DC offset, in an analog or digital manner, rather than eliminating it through a filtering operation. One way to estimate the DC offset is to do it during a silence period, i.e. during a period where no signal is present at the antenna. In fact, in these conditions, the only signal present in the reception subsystem is the DC offset, thereby making it favorable to estimate the DC offset, for example, by using a low-pass filter of low complexity. However, such an approach uses the presence and the knowledge of the silence periods, which implies partial or total synchronization of the network or a network with low traffic.

However, in certain cases, the silence periods do not exist or are very short by comparison to the actual transmission periods, as is the case in, for example, the cellular systems operating in accordance with the Worldwide Interoperability for Microwave Access (WiMAX) standards. WiMAX is a family of standards that define high bit rate connections by microwave channel, being intended mainly for point-multipoint architectures. The WiMAX standards include in particular the standards of the IEEE 802.16 family.

Another method of estimating the DC offset is to first synchronize the receiver and then perform an estimation of this DC offset by using, for example, a Forward Fourier Transform (FFT) module of the receiver, for example, an Orthogonal Frequency Division Multiplexing (OFDM) receiver. However, with such an approach, the synchronization is performed in the presence of a high DC offset level, which can sometimes range up to 50% of the operating range of the analog-to-digital converter. This implies the use of digital filters to eliminate the DC offset while performing a cell or incoming signal search and while reducing the gain of the analog stage in order to avoid a saturation of the analog-to-digital conversion stage. Consequently, the level of the signal and the level of the signal-to-noise ratio (SNR) are reduced, thereby leading to a reduction in the sensitivity of the receiver.

Most of the wireless communication standards using a modulation of the OFDM type have taken account of this problem of self-mixing (self-transposition) of the local oscillator signal, giving rise to the creation of the DC offset. In practice, in such transmission standards, there is no signal transmitted on the zero frequency (DC frequency). Consequently, the DC offset has no effect provided that the carrier frequency of the transmitter and the carrier frequency of the receiver are perfectly synchronized. However, on the one hand, this is not the case before synchronization and, on the other hand, a perfect synchronization is consequently used, which is an ideal case, i.e. not arising in practice.

Also, the DC offset level is typically reduced in the OFDM systems to address the impact of the carrier frequency offset and of inter-carrier interference. Furthermore, the presence of this DC offset component in the digital signal has an impact on the dimensioning of the digital part of the receiver. Consequently, most of the RF receivers, and in particular the receivers of the direct conversion type, are very carefully designed so as to minimize this self-transposition of the local oscillator signal and reduce the DC offset level.

However, such a minimization is not yet sufficient and consequently uses an estimation of the DC offset level in order to compensate for it as much as possible. Moreover, considering the context of a WiMAX receiver, certain applications use the processing of the DC offset to be performed before any synchronization, the synchronization being possible only if the imperfections of the signal are reduced.

SUMMARY OF THE INVENTION

According to an embodiment, a method and a device for processing the DC offset of a RF reception subsystem that avoids the use of a high-pass DC filter is disclosed herein.

According to another embodiment, a device for processing the DC offset of a RF reception subsystem that does not use a transmission silence period or partial or total synchronization of the network is disclosed.

According to another embodiment, a method and a device that can be used to estimate and to compensate for the DC offset in the presence of a non-deterministic broadband signal at the antenna, before synchronization and in a direct conversion type architecture, is disclosed.

According to another embodiment, a system for compensating for the DC offset in a system of either the time division duplex type, the frequency division duplex type (separate frequencies for transmission and reception), or the Time Division Multiple Access system type without network synchronization is disclosed.

According to one aspect, a method of processing the DC offset of a RF reception subsystem may include partitioning of the analog part of the reception subsystem into a number of zones. For each zone, the method may include providing a calibration of the basic (initial) DC offset compensation to be applied to the subsystem within an operating range of the zone. The operating range of the other zones may be limited to a so-called minimum operating range, and a determination of the DC offset compensation to be applied to the subsystem throughout its operating range may be based on the basic compensations.

Thus, according to this aspect, the different zones of the analog part of the reception subsystem may be calibrated separately, and a consolidation processing operation may then be performed by taking particular account of the possible gain combinations. Thus, it becomes possible, by this separation of the zones, to measure and compensate for the DC offset without being concerned with knowing whether a signal is present at the input of the reception subsystem, thereby avoiding any saturation or spurious influence of the various stages and in particular of the analog-to-digital conversion stage of the reception subsystem.

According to one implementation, for the analog part comprising an analog-to-digital conversion stage, the characteristics of the minimum operating range of each zone may be chosen so as to avoid a saturation of the analog-to-digital conversion stage. The minimum operating range of a zone can comprise a stopping of the operation of this zone or even an operation of this zone with a minimum gain or a gain that can vary within a reduced range of gains delimited by the minimum value and a limit value.

According to one implementation, the operation of the zones situated upstream of the zone to be calibrated may be stopped, which makes it possible to increase the isolation with respect to the antenna. Whereas, the zones situated downstream of the zone to be calibrated may be made to operate with a minimum gain or in a reduced gain range, which helps to avoid saturation of the analog-to-digital conversion stage.

According to one embodiment, calibration of the basic compensation of a zone may comprise determining a set of basic compensation values to be injected into the subsystem, and determining the DC offset compensation to be applied to the subsystem throughout its operating range, including aggregations, possibly weighted, of the basic compensation values. Thus, for example, the calibration of the basic compensation of a zone may comprise variation of the gain of the zone and, for each gain value, a determination of a basic compensation value to be injected into the subsystem.

The method and device for processing the DC offset of a REF reception subsystem may apply to a reception subsystem of the direct conversion type. Such a subsystem may comprise, for example, a first amplification stage, for example, a low noise amplification stage, coupled to the antenna of the subsystem, a frequency transposition stage coupled to the first amplification stage, and a second amplification stage coupled between the frequency transposition stage and an analog-to-digital conversion stage. The subsystem is then, for example, partitioned into a first zone incorporating the first amplification stage and the frequency transposition stage and into a second zone incorporating the second amplification stage and the analog-to-digital conversion stage.

According to another aspect, a device for processing the DC offset of a RF reception subsystem is disclosed. According to this aspect, the analog part of the reception subsystem is partitioned into a number of zones. The device may comprise a calibration module capable of performing a calibration of the basic DC offset compensation to be applied to the subsystem in the operating range of a zone, a controller for limiting the operating range of a zone to a minimum operating range, a monitoring module for, for each zone, activating the calibration module and activating the controller for the other zones, and a determination module capable of determining the DC offset compensation to be applied to the subsystem throughout its operating range based on the basic compensations.

According to an embodiment, the analog part comprises an analog-to-digital conversion stage, and the characteristics of the minimum operating range of each zone are chosen so as to avoid a saturation of the analog-to-digital conversion stage. The controller can also stop the operation of a zone or make it operate with a minimum gain or with a gain that can vary in a reduced gain range delimited by the minimum value and a limit value. The controller may be for stopping the operation of the zones situated upstream of the zone to be calibrated and for making the zones situated downstream of the zone to be calibrated operate with a minimum gain or in the reduced range of gains.

According to an embodiment, the calibration module may be for determining, for a zone, a set of basic compensation values to be injected into the subsystem, and the determination module may comprise an aggregation module for performing aggregations, possibly weighted, of the basic compensation values. Thus, for example, the calibration module can comprise a first gain module for varying the gain of a zone and a second gain module for determining for each gain value a basic compensation value to be injected into the subsystem.

According to another aspect, a reception subsystem of a wireless communication appliance may incorporate at least a part of the processing device as defined hereinabove. According to one embodiment, the subsystem may be of the direct conversion type and may comprise a first amplification stage coupled to the antenna of the subsystem, a frequency transposition stage coupled to the first amplification stage, and a second amplification stage coupled between the frequency transposition stage and an analog-to-digital conversion stage. The partition of the subsystem may comprise a first zone incorporating the first amplification stage and the frequency transposition stage, and a second zone may incorporate the second amplification stage and the analog-to-digital conversion stage. According to another aspect, a wireless communication appliance may incorporate a reception subsystem as defined hereinabove.

BRIEF DESCRIPTION OF THE DRAWINGS

Other characteristics and advantages of the invention may become apparent from studying the detailed description of implementations and embodiments, which is by no means limiting, and the appended drawings in which.

DETAILED DESCRIPTION OF THE EMBODIMENTS

Figure 1:
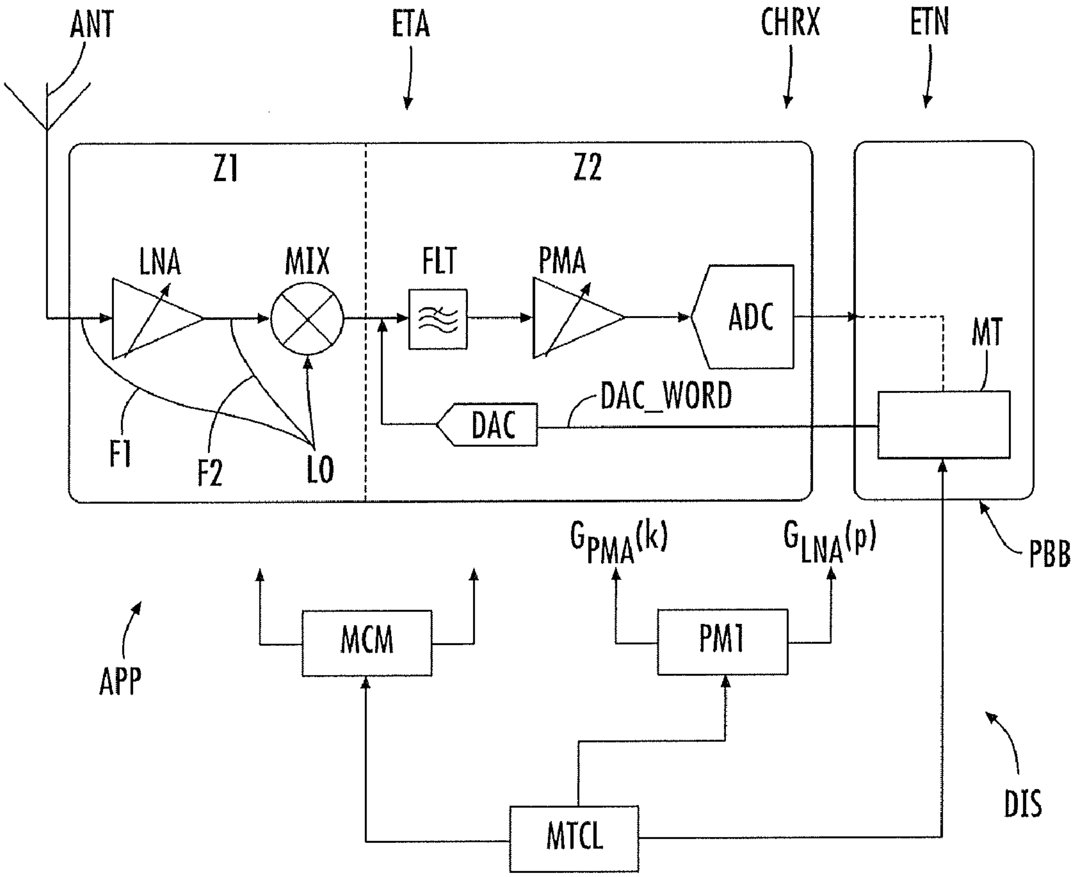
FIG. 1 is a schematic diagram of a reception subsystem, according to the present invention.

With reference to FIG. 1, a wireless communication appliance APP comprises a RF reception subsystem CHRX having architecture of the direct conversion type or zero intermediate frequency type (ZIF) architecture. More specifically, the analog part ETA of the subsystem CHRX comprises a first amplifier LNA, which is generally a low noise variable gain amplifier, the input of which is coupled to the antenna ANT.

The output of the amplifier LNA is coupled to the input of a frequency transposition stage or mixer MIX which also receives the transposition signal or local oscillator LO signal so as to perform a transposition directly into the baseband. A second variable gain amplification stage PMA is coupled to the output of the mixer MIX via a low-pass filter FLT. The output of the amplification stage PMA is linked to an analog-to-digital conversion stage ADC connected by its output to the digital part ETN of the reception subsystem, which here comprises a processor PBB also commonly designated baseband processor.

Typically, the reception subsystem comprises, downstream of the mixer MIX, two channels in phase quadrature I and Q, which have not been represented separately in FIG. 1 in the interests of simplicity. As can be seen in FIG. 1, the local oscillator LO signal leaks to the input of the amplifier LNA (arrow F1) and to the input of the mixer MIX (arrow F2). The leakage signal at the input of the amplifier LNA is amplified by the amplifier LNA, and the overall leakage signal consequently undergoes a multiplication by itself (self-transposition) within the mixer MIX, which is consequently one of the sources of the DC offset (DCO).

Also, there is provided a device DIS for processing the DC offset DCO of the RF reception subsystem CHRX. As may be seen in more detail hereinbelow, this device uses partitioning of the analog part ETA of the reception subsystem CHRX into a number of zones. In the example illustrated in FIG. 1, the partitioning is performed into two zones Z1 and Z2. More specifically, in the example described here, which is purely illustrative and nonlimiting, the first zone Z1, which is the zone closest to the antenna ANT, comprises the amplifier LNA and the mixer MIX, whereas the second zone Z2 comprises, in particular, the variable gain amplifier PMA and the analog-to-digital conversion stage ADC.

The device DIS then comprises calibration means capable of performing a calibration of the basic (initial) DC offset compensation to be applied to the subsystem in an operating range of a zone Z1. As may be seen in more detail hereinbelow, these calibration means are distributed in particular within processing means MT implemented, for example, as software within the baseband processor PBB. The device DIS also comprises control means MCM capable of limiting the operating range of a zone to a minimum operating range, for example, placing the zone in a stopped operating state or in a minimum gain operating state.

Monitoring means MCTL are capable, for each zone, of activating the calibration means and of activating the control means for the other zones. Finally, determination means, also for example incorporated as software within the processing means MT, are capable of determining the DC offset compensation to be applied to the subsystem CHRX throughout its operating range based on the basic compensations.

Figure 3:
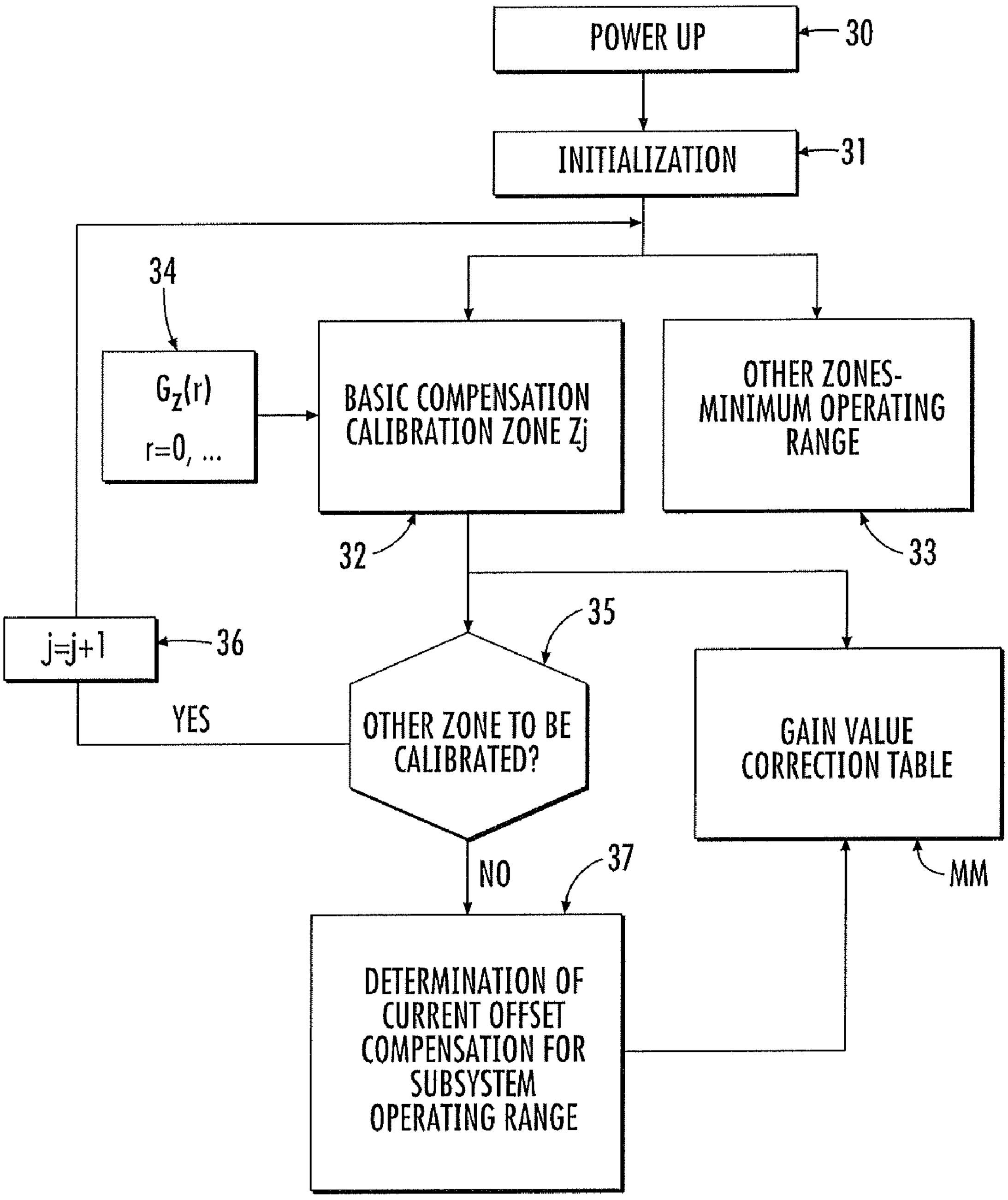
FIGS. 3 and 4 are flowcharts that illustrate a method, according to the present invention.

Referring now to FIG. 3, after the appliance APP has been powered up and after a conventional initialization step 31 during which the receiver is stabilized in particular, the basic compensations of each of the zones Zj of the analog part ETA of the reception subsystem CHRX are calibrated (step 32). In this respect, when the basic compensation of a zone Zj is calibrated, the operating range of the other zones is limited to a minimum operating range, the characteristics of which may be described in more detail hereinbelow (step 33).

The calibration of the basic compensation associated with the zone Zj during calibration is performed, for example, by varying the gain of the variable gain elements of this zone Zj in their operating range (step 34). Also, for each gain value $G_Z(r)$ of the zone Zj, r varying from zero to the number of possible gain values, the DC offset level resulting from this gain value is measured and the basic compensation value to be injected into the reception subsystem is determined. All these basic compensation values are then stored in a correction table stored, for example, in a memory MM.

There are then carried out, in turn, the calibrations of the basic compensations of the other zones and, when all the zones have been calibrated, the current offset compensation is then determined (step 37) for the entire operating range of the subsystem by using the basic compensation values obtained from the basic calibrations of the different zones. The DC offset compensation to be applied in the subsystem is delivered at the output of a digital-analog conversion stage DAC based on a digital compensation word DAC_word delivered to the converter DAC by the means MT.

Figure 4:
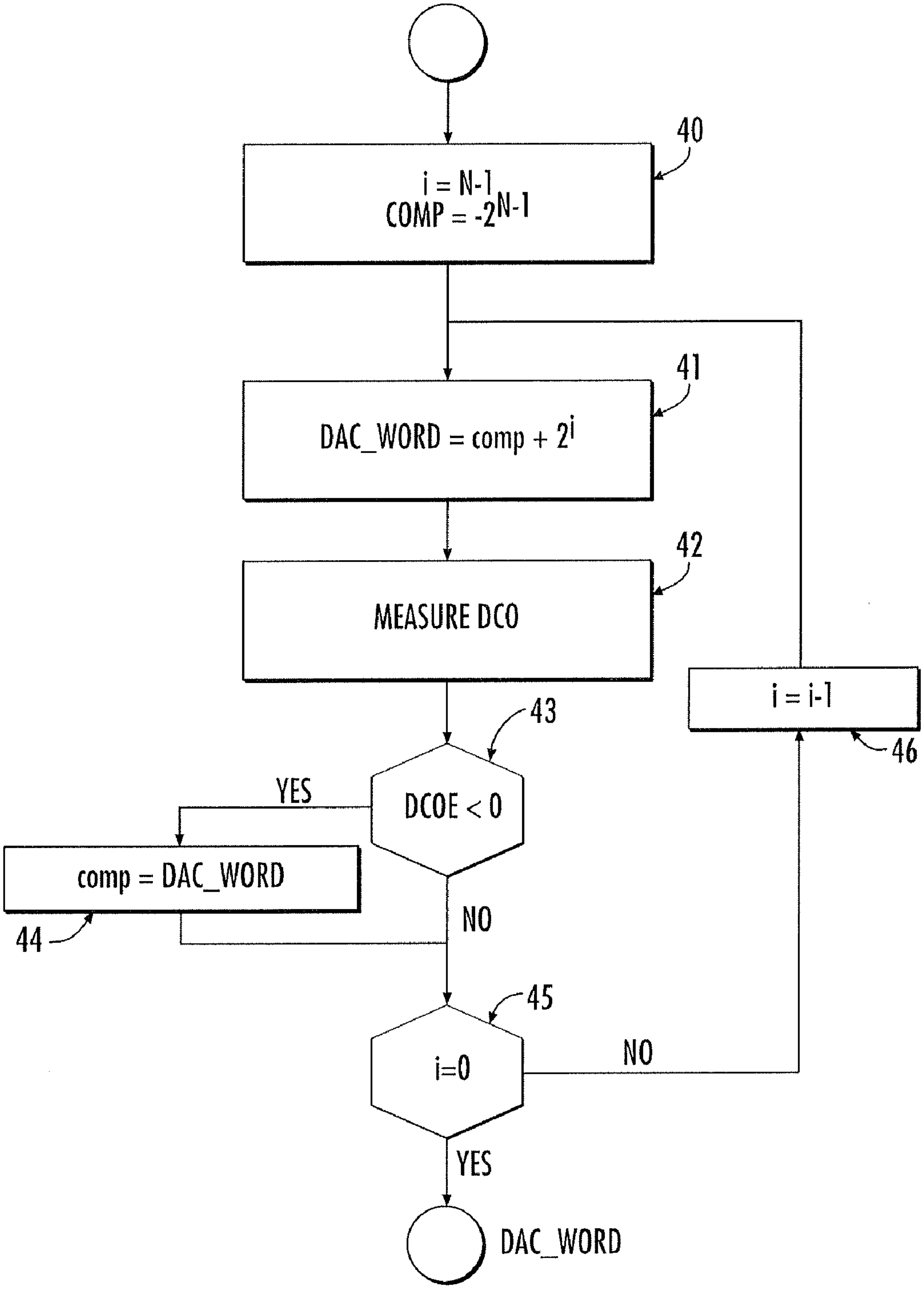

FIG. 4 illustrates an example of the generation of a digital compensation word DAC_word. This implementation uses a conventional dichotomy method applicable to a digital-analog converter DAC with N signed bits. More specifically, after having initialized a variable comp and an index i (step 40), the value of the compensation word DAC_word is set to the sum of the variable comp and of $2^i$ (step 41). The DC offset level DCOE is then measured (step 42).

In this respect, this measurement can be performed by any conventional manner known to those skilled in the art. As an indication, this measurement of the DC offset level DCO can be based on a programmable low-pass filter or even a cascade of programmable low-pass filters, which can be implemented digitally in the baseband processor. For example, the simplest low-pass filter to be used can be an averaging filter. This makes it possible to measure the DC offset when the useful and modulated data is present in the signal without saturation and while avoiding the wait for a silence zone.

Once this measurement is performed, the value DCOE obtained on completion of the step 42 is compared to zero (step 43). If this value is negative, the variable comp is given the value of the word DAC_word (step 44). Then, in the step 45, the i value is compared to zero. If DCOE is positive or zero, the method moves directly to the step 45. If i is different from zero, the value of i is then decremented (step 46) and, until the variable i has reached the zero value, the steps 41 to 44 are repeated. At the end of this dichotomy process, the value of the compensation word DAC_word is obtained.

In terms of hardware, the calibration means comprise first means PM1 (FIG. 1) capable of varying the gain of a zone during calibration and second means PM2 capable, for each gain value, of determining the basic compensation value to be injected into the subsystem, the basic compensation value being obtained from the word DAC_word. These means PM1 and PM2 can also be implemented in software form, for example.

Figure 5:
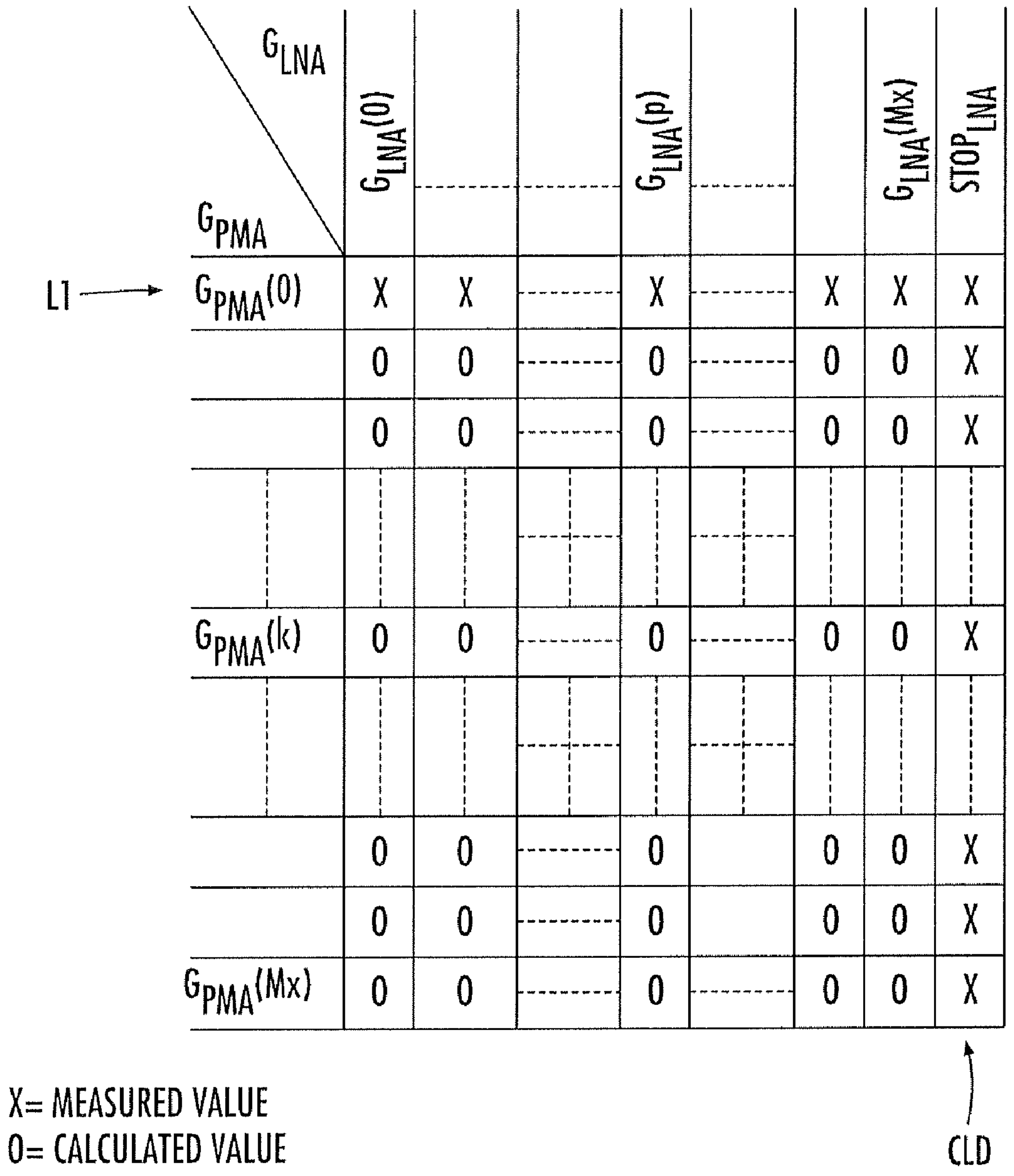
FIG. 5 illustrates processing of the DC offset from FIG. 1.

Referring now to FIG. 5, an example of the processing of the DC offset from the architecture of FIG. 1 is now described. Although this is not essential, the zones may be calibrated beginning with the zone furthest from the antenna. In the present case, the first step may therefore be to calibrate the zone Z2, that is the one that in particular comprises the amplifier PMA. For this, as indicated previously, the operating range of the elements of the zone Z1 may be limited to a minimum operating range. In the present case, since the zone Z1 is located upstream of the zone Z2, the operation of the amplifier LNA (designated $LNA_{off}$ hereinafter) may purely and simply be stopped.

The means PM1 then vary the gain of the amplifier PMA in its operating range from its minimum value $G_{PMA}(\mathbf{0})$ to its maximum value $G_{PMA}(Mx)$. For each of the gain values $G_{PMA}(k)$, the residual DCO is measured and the compensation word DAC_word is determined. All the measured compensation values marked with a cross in the last column CLD of the correction table of FIG. 5 are then obtained. Once this zone calibration is completed, the next step is to calibrate the zone Z1. To do this, since the zone Z2 is located this time downstream of the zone Z1, preference may be given to limiting the gain of the amplifier PMA. A choice may be made, for example, to set this gain to its minimum value $G_{PMA}(\mathbf{0})$.

The gain of the amplifier LNA is then varied in its operating range with a chosen pitch between the minimum value $G_{LNA}(\mathbf{0})$ and its maximum value $G_{LNA}(Mx)$. Also, for each gain value $G_{LNA}(P)$, the residual DCO is measured and the compensation word DAC_word is determined. All of the measured values marked by a cross and included in the first line L1 of the correction table of FIG. 5 are then obtained. Once these two calibrations are completed, the other compensation values marked with a circle in the table of FIG. 5, and valid for all the other gain combinations, may be calculated.

Figure 2:
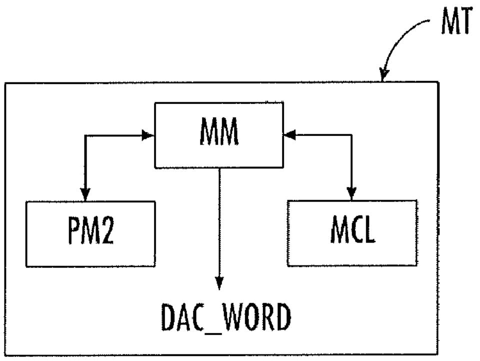
FIG. 2 illustrates the processor of FIG. 1 in detail.

These calculated values may be calculated by means MCL incorporated in the processing means MT (FIG. 2). These calculated values may also be stored in the correction table stored in the memory MM. More specifically, if $DCO_{comp}(G_{LNA}, G_{PMA})$ is used to designate the compensation value to be applied in the subsystem CHRX for any value of the gain of the amplifier LNA and for any value of the amplifier PMA, this value $DCO_{comp}(G_{LNA}, G_{PMA})$ is defined by the formula I below:

$$DCO_{comp}(G_{LNA},G_{PMA})=DCO_{comp}(LNA_{off},G_{PMA})+DCO_{comp}(G_{LNA},G_{PMA}(0)) \quad (I)$$

in which $DCO_{comp}(LNA_{off}, G_{PMA})$ represent the compensation values measured with the amplifier LNA stopped (last column CLD of the table of FIG. 5) and in which $DCO_{comp}$, $(G_{LNA}, G_{PMA}(\mathbf{0}))$ represent the compensation values measured with the minimum gain for the amplifier PMA (value of the first line L1 of the table of FIG. 5).

Although the formula (I) is entirely satisfactory, it is possible to further enhance the accuracy of calculation of the resultant compensation value by subtracting, in the right hand part of the formula (I), the term $DCO_{comp}(LNA_{off}, G_{PMA}(\mathbf{0}))$. As a nonlimiting example, the signal present at the antenna in normal operation can be a WiMAX signal. The WiMAX standard offers the following properties: absence of DC offset at the transmission subsystem level and, in the event of carrier frequency error, the maximum DC component present at the reception subsystem level is very low compared to the total signal level, Gaussian-type distribution in the time domain, and quasi-flat distribution in the frequency domain.

It is also possible, for example, to vary the gain of the amplifier PMA from 4 to 30 dB in 2 dB steps. Moreover, although this is not represented in FIG. 1, the reception subsystem CHRX generally comprises a front-end module, known to those skilled in the art, which can be used to select the band to be demodulated through filters. Also, most of the front-end modules make it possible to address a number of frequency bands of one or more transmission standards. The front-end module then comprises switchable filters. Also, such switchable filters provide, depending on the position to which they are switched, an additional isolation of the order of 20 to 30 dB.

Thus, in a bi-mode reception subsystem, for example, a WiMAX mode and a GSM mode, the front-end module may be switched to the GSM position, which may make it possible to provide this additional isolation of 20 to 30 dB in the WiMAX application for the calibration of the reception DCO. This switching can be performed during the initialization phase 31 (FIG. 3). Such an additional isolation further contributes to avoiding a saturation of the analog-to-digital conversion stage ADC of the reception subsystem.

In the example that has just been described, when the zone Z2 is being calibrated, the gain of the amplifier PMA is varied throughout its range of gain values. That is, it would be possible to use only a few gain values of this range to measure the values of the residual DCO and then determine by calculation the other compensation values. Similarly, to further improve the compensation accuracy, it would be possible, assuming that the analog-to-digital conversion stage ADC is not saturated, to perform, during the calibration of the zone Z1, measurements of the residual DCO by successively setting the amplifier PMA to its minimum gain value then to one or more immediately higher gain values. A greater number of measured values would then be obtained, which would limit the number of table values to be calculated.

Figure 6:
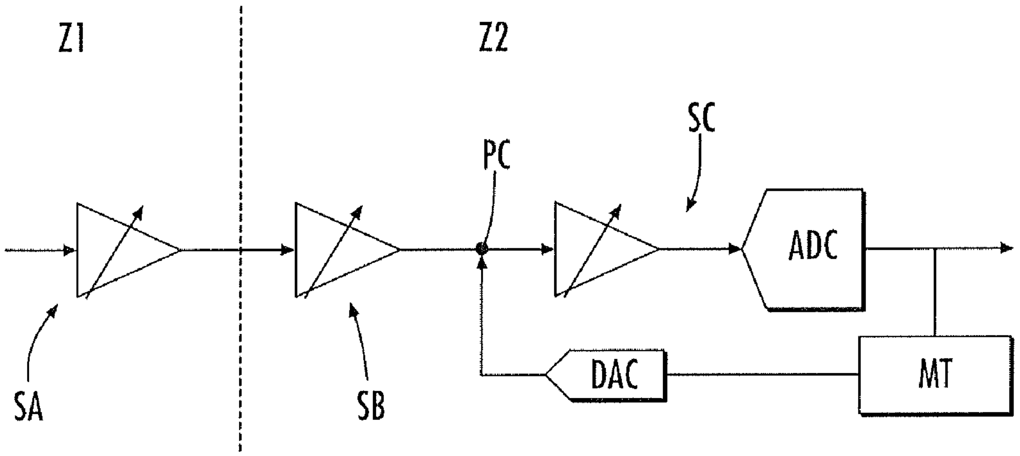
FIGS. 6 and 7 illustrate examples of partitioning of a reception subsystem, according to the present invention.

Moreover, this disclosure is not limited to the type of illustrative example of FIG. 1. As an indication, it would be possible to apply the method according to the disclosure to a subsystem of the type of that illustrated in FIG. 6, also partitioned into zones Z1 and Z2 but, this time, a variable gain element SB of the zone Z2 is positioned upstream of the compensation point PC, which was not the case in FIG. 1. If it is assumed that the zone Z1 comprises a variable gain element SA, and that the zone Z2 also comprises a variable gain element ZC situated downstream of the compensation point PC, then the compensation values $DCO_{comp}(G_A, G_B, G_C)$ that may be applied to the subsystem for any value of the gains $G_A$, $G_B$, $G_C$ of the elements SA, SB and SC, is defined as a first approximation by the formula (II) hereinbelow.

$$DCO_{comp}(G_A,G_B,G_C)=DCO_{comp}(SA_{off},G_B,G_C)+(G_B/G_{Bmin})DCO_{comp}(G_A,G_{Bmin},G_{Cmin}) \quad (II)$$

Figure 7:
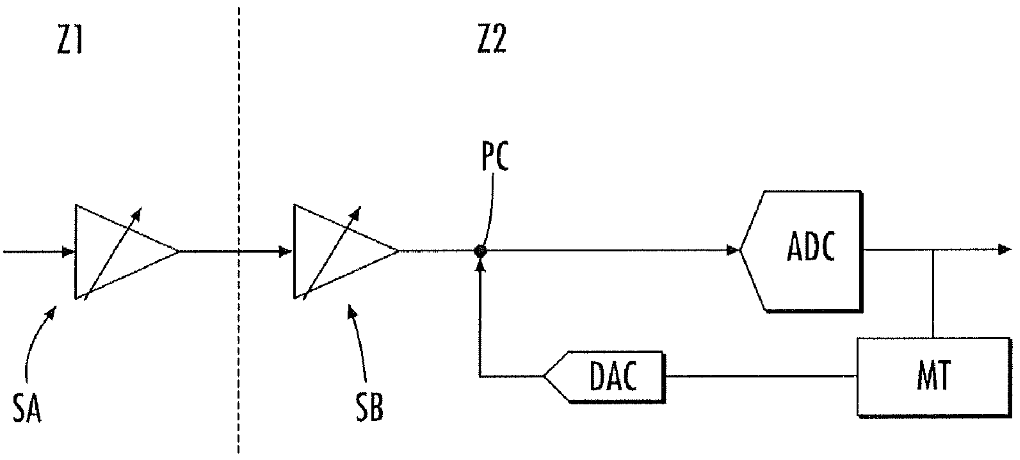

It can then be seen that this overall compensation value is a sum weighted by the ratio $G_B/G_{Bmin}$, that is, by the gain of the element SB situated upstream of the compensation point PC. In this formula (II), $SA_{off}$ indicates that the element SA is off and $G_{Bmin}$ and $G_{Cmin}$ indicate the minimum gain values for the elements $S_B$ and $S_C$. It would also be possible, as illustrated in FIG. 7, not to have variable gain elements downstream of the compensation point PC of the zone Z2. In this case, $DCO_{comp}(G_A, G_B)$ is defined as a first approximation by the formula (III) hereinbelow:

$$DCO_{comp}(G_A,G_B)=DCO_{comp}(SA_{off},G_B)+(G_B/G_{Bmin})DCO_{comp}(G_A,G_{Bmin}) \quad (III)$$

That which is claimed:

1. A method of compensating for direct current (DC) offset in a radio frequency reception device, the method comprising:

partitioning an analog portion of the reception device into a plurality of zones;

for each zone, calibrating an initial DC offset compensation to be applied within an operating range of a respective zone, the operating range of the other zones being limited to a threshold operating range; and determining an actual DC offset compensation to be applied to the plurality of zones based on the initial DC offset compensations.

2. The method according to claim 1 wherein the analog portion comprises an analog-to-digital converter; and wherein the threshold operating range for each zone is based upon saturation of the analog-to-digital converter.

3. The method according to claim 2 wherein the reception device comprises a direct conversion reception device.

4. The method according to claim 3 wherein the direct conversion reception device comprises:

an antenna;

a first amplifier coupled to the antenna;

a frequency transposition stage coupled to the first amplifier; and a second amplifier coupled between the frequency transposition stage and the analog-to-digital converter.

5. The method according to claim 4 wherein the reception device is partitioned into a first zone comprising the first amplifier and the frequency transposition stage and into a second zone comprising the second amplifier and the analog-to-digital converter.

6. The method according to claim 1 wherein the calibrating of the initial DC offset compensation for the respective zone comprises stopping operation of the respective zone.

7. The method according to claim 6 wherein the zones upstream of the respective zone to be calibrated are stopped; and wherein the zones downstream of the respective zone to be calibrated operate with at least one of a first threshold gain and a gain delimited by the first threshold gain and a second threshold gain.

8. The method according to claim 1 wherein the calibrating of the initial DC offset compensation for the respective zone comprises operating the respective zone with at least one of a first threshold gain and a gain in a range defined by the first threshold gain and a second threshold gain.

9. The method according to claim 1 wherein the calibrating of the initial DC offset compensation of the respective zone comprises determining a set of initial compensation values to be applied in the reception device; and wherein the determining of the actual DC offset compensation comprises weighting the set of initial compensation values, and aggregating the weighted set of initial compensation values.

10. The method according to claim 9 wherein the calibrating of the initial DC offset compensation of the respective zone comprises varying gain of the respective zone, and for each gain value, determining a initial compensation value to be applied in the reception device.

11. A device for compensating for direct current (DC) offset in radio frequency reception, the device comprising:

a reception module including an analog portion being partitioned into a plurality of zones;

a calibration module configured to perform a calibration of an initial DC offset compensation applied to a respective zone in an operating range;

a controller configured to limit the operating range of the respective zone to a threshold operating range;

a monitoring module configured to activate said calibration module and said controller for the other zones; and a determination module configured to determine an actual DC offset compensation applied to the plurality of zones based on the initial DC offset compensations.

12. The device according to claim 11 wherein said analog portion comprises an analog-to-digital converter; and wherein the threshold operating range of each zone is based upon saturation of said analog-to-digital converter.

13. The device according to claim 12 wherein said reception module comprises a direct conversion reception module.

14. The device according to claim 13 wherein said direct conversion reception module comprises:

an antenna;

a first amplifier coupled to said antenna;

a frequency transposition stage coupled to said first amplifier; and a second amplifier coupled between said frequency transposition stage and said analog-to-digital converter.

15. The device according to claim 11 wherein said controller is configured to stop operation of the respective zone.

16. The device according to claim 11 wherein said controller is configured to set gain of the respective zone to at least one of a first threshold gain and a gain in a range defined by the first threshold gain and a second threshold gain.

17. The device according to claim 11 wherein said controller is configured to stop operation of zones upstream of the respective zone being calibrated; and wherein said controller is configured to set zones downstream of the respective zone being calibrated to a gain of at least one of a first threshold gain and a gain in a range defined by the first threshold gain and a second threshold gain.

18. The device according to claim 11 wherein said calibration module is configured to determine, for each zone, a set of initial compensation values to be applied to the device; and wherein said determination module comprises an aggregation module configured to aggregate weighted initial compensation values.

19. The device according to claim 11 wherein said calibration module comprises:

a first gain module configured to vary gain of the respective zone; and a second gain module configured to determine, for each gain value, a initial compensation value to be applied to the device.

20. A wireless communications device comprising:

an antenna configured to receive a radio frequency (RF) signal; and a device cooperating with said antenna and configured to compensate for direct current (DC) offset in the received RF signal and comprising a reception module including an analog portion being partitioned into a plurality of zones, and a controller configured to perform a calibration of an initial DC offset compensation in an operating range of a respective zone, limit the operating range of the respective zone to a threshold operating range, and determine an actual DC offset compensation for the plurality of zones based upon the initial DC offset compensations.

21. The wireless communications device according to claim 20 wherein said analog portion comprises an analog-to-digital converter; and wherein the threshold operating range of each zone is based upon saturation of said analog-to-digital converter.

22. The wireless communications device according to claim 20 wherein said controller is configured to stop operation of the respective zone.

23. The wireless communications device according to claim 20 wherein said controller is configured to set gain of the respective zone to at least one of a first threshold gain and a gain in a range defined by the first threshold gain and a second threshold gain.

* * * * *